May 27, 1941.　　　G. A. WAHLMARK　　　2,243,139
HYDRAULIC CIRCUIT
Filed May 15, 1937　　　2 Sheets-Sheet 2

Fig. 2

Inventor:-
Gunnar A. Wahlmark.
By [signature]
his Atty.

Patented May 27, 1941

2,243,139

UNITED STATES PATENT OFFICE 2,243,139

HYDRAULIC CIRCUIT

Gunnar A. Wahlmark, Rockford, Ill.

Application May 15, 1937, Serial No. 142,886

10 Claims. (Cl. 60—52)

The invention relates to a hydraulic circuit and has as a general object to provide a novel and improved circuit for supplying operating fluid to a hydraulic motor at selectively different rates for actuating a member driven by the motor at different speeds in opposite directions and under different loads.

A more particular object of the invention is to provide a novel and improved hydraulic circuit particularly adapted for supplying operating fluid to a reversible hydraulic motor at relatively different rates and directions of flow for reciprocating a tool or work support of a machine tool at different speeds and under different loads.

Another object of the invention is to provide a new and improved hydraulic circuit for a machine tool which is unusually flexible in its adjustments and operation so as to make readily obtainable a large variety of cycles of operation of the machine tool.

Another object is to perfect a novel hydraulic circuit for a machine tool capable of imparting a feed movement to a table of the machine tool in two directions of movement.

Yet another object is to perfect a hydraulic circuit for a machine tool in which a table of the machine tool driven by the circuit is capable of being reversed from a feed rate of movement in one direction to a feed rate of movement in the opposite direction in addition to the customary reversal from feed to traverse.

Still another object is to perfect a hydraulic circuit for a machine tool having simplified and improved means for obtaining a dwell at the end of the table movement in either direction.

A further object is to provide a hydraulic circuit for a machine tool in which the supply of operating fluid by the circuit to the hydraulic motor driving a table of the machine tool is reduced to a minimum during the dwell of the table at the end of movement in one direction.

Still a further object is to provide in a hydraulic circuit for a machine tool a remotely controlled electrically actuated valve for temporarily arresting the movement of the table regardless of the rate or direction at which it is moving.

Yet a further object is to perfect for use in a hydraulic circuit a remote control pilot valve of new and improved construction.

Other objects and advantages will become apparent from the following detailed description taken in connection with the accompanying drawings, in which.

Though the hydraulic circuit is susceptible of various modifications and alternative constructions, it is shown in the drawings and will hereinafter be described in a preferred embodiment and a modification of a portion thereof, but it is not intended that the invention is to be limited thereby to the specific construction disclosed, but is intended to cover all modifications and alternative constructions falling within the spirit and scope of the invention as defined by the appended claims.

While a hydraulic circuit embodying the features of the invention might be employed in a variety of devices and through a hydraulic motor actuate a member at different speeds and through different cycles, the hydraulic circuit is for purposes of disclosure herein shown and will hereinafter be described as particularly arranged for employment with a machine tool, more particularly, for driving a double end table or slide of a machine tool, such as a milling machine. Such a double end table or slide commonly has a neutral or central stop position and is driven either to the right or to the left from its central position to the limit of its movement in one direction, and is then reversed and returned to its central position. As is well known, the table may then be stopped and started on a new cycle in the opposite direction, or it may reciprocate continuously through its central position. In such reciprocation, the table is normally driven at different speeds. One such speed is a high speed which is imparted to the table while the tool and the work are out of engagement and is commonly called "rapid traverse." This traverse rate is employed in the movement of the table either to the right or to the left of central position, and is employed to bring the work and the tool together or to separate the work and the tool. Another such speed is a substantially lower speed during which the tool is in engagement with the work and performs its cutting operation. This speed must be maintained with a high degree of smoothness and uniformity as compared with "rapid traverse" and is commonly known as "feed." The table may also be arrested temporarily at some point other than its normal stop position usually at the end of the movement to the right or to the left and this temporary rest is known as "dwell." Provided the circuit is flexible enough, movement of the table at these speeds and to the right or to the left may be arranged in any predetermined sequence to obtain the cycle of movement desired.

To impart any desired cycle of movement to the table, the hydraulic circuit herein comprises generally a reversible hydraulic motor 10, a unitary pressure generating and control device generally designated 11 (see Fig. 1) and remote control valve means for governing the operation of the pressure generating and control device. The pressure generating and control device is housed in a single casing 12 and comprises pumping mechanism (see Fig. 2) composed of a large output constant displacement pump 13, commonly known as a "traverse" pump, and a low output variable displacement pump 14, commonly known as a "feed" pump, and governing mechanism composed of a plurality of valve means directly associated with the pumping mechanism for controlling the fluid discharge from the device. Pump 14 is of unique construction and is associated with the traverse pump and the motor in a unique manner so that all fluid flowing to the motor passes through the pump 14 and so that the pump 14 functions or acts in a variety of ways upon different quantities of fluid supplied by the traverse pump and thus determines the quantity of fluid supplied to the motor, though both pumps continue to operate. More particularly, under one condition the pump 14 functions to discharge no fluid whatsoever with the result that the motor remains stationary, while under another condition, the pump 14 functions to meter and to boost the pressure of a portion of the fluid supplied by the traverse pump thus to drive the motor at a "feed" rate, and, while under yet a different condition, the pump 14 functions to pass all of the fluid supplied by the traverse pump without acting thereon with the result that the motor is driven at a "traverse" rate.

Figures 1, 3:
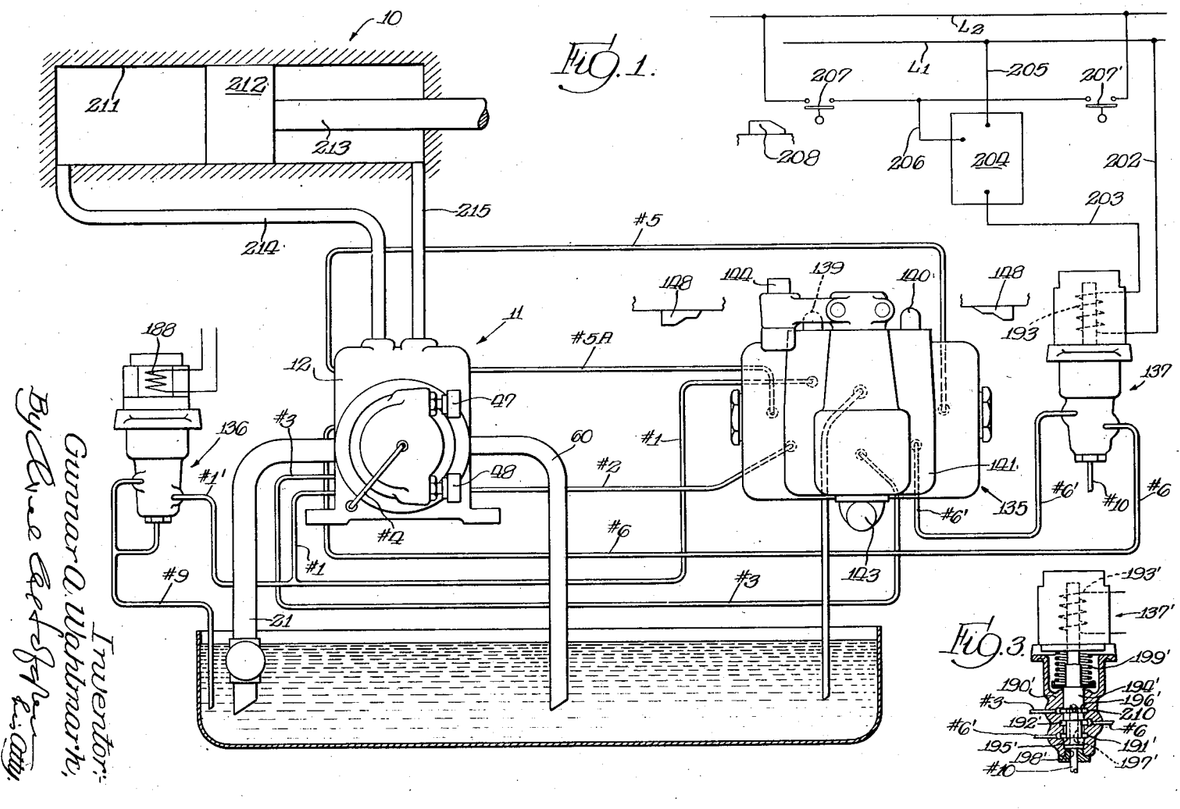
Fig. 1 is a piping diagram of a hydraulic circuit embodying the features of the invention.
Fig. 3 is a sectional view of a modified form of valve which may be incorporated in the circuit to modify the character thereof.

Of the plurality of valve means constituting the governing mechanism, a valve means generally designated 15 governs the volume of fluid discharge from the device and includes valves governing the conditions determining the manner in which the pump 14 functions and a valve controlling the displacement of the pump 14. Other valve means generally designated 16 governs the direction of fluid discharge from the device 11 and consists of a single valve, while a third valve means generally designated 17 limits the pressure of the discharge and consists of two valves, one in the nature of a high pressure relief valve and the other in the nature of a low pressure limit valve or circuit locking valve. The governing mechanism and the pumping mechanism, as previously stated, are formed as a unitary device housed in a casing 12 as shown in Fig. 1, which casing is diagrammatically represented in Fig. 2 by the dot-dash line enclosing the pumping and governing mechanisms. Such embodiment of governing and pumping mechanism in a single unitary structure is more particularly disclosed and claimed in my application Ser. No. 141,327, filed May 7, 1937, now Patent No. 2,214,390, issued Sept. 10, 1940.

The remote control means is of unique construction and is composed of a plurality of valve means both manually and automatically operable. These valve means are hydraulically associated with the valve means of the governing mechanism and control the same to obtain the desired cycle of operation.

The unitary pressure generating and control device 11 disclosed herein differs only slightly from that disclosed in my said Patent No. 2,214,390 and will thus be described briefly, reference being made to my patent just referred to for a more complete disclosure of the precise formation and location in a unitary structure of the pumping mechanism, the governing mechanism and the passages and ducts interconnecting the same. Movement of the table at a high speed or traverse rate requires no high degree of uniformity and the fluid for effecting such movement may be supplied by any pump capable of a large output at the required pressure. Herein the rapid traverse pump 13 is shown as a constant displacement variable pressure pump of the rotary type, such as more particularly disclosed and claimed in my copending applications Serial No. 675,218, filed June 10, 1933, now Patent No. 2,132,813, issued Oct. 11, 1938, and Serial No. 14,017, filed April 1, 1935, now Patent No. 2,146,037, issued Feb. 7, 1939. The pump 13 is adapted to be continuously rotated during the operation of the machine and functions in well known manner to draw fluid, preferably oil, into the pump from a tank or reservoir 20 through an intake pipe 21, an intake port 22 formed in the casing 12 and a port 23 of the pump and to discharge the fluid through a port 24 into a passage 25 formed within the casing 12.

When the tool is in engagement with the work, that is, during the feed movement of the table, a slow uniform movement of the table is required and necessitates the supply to the motor 10 of a small quantity of fluid at an accurately metered rate. The pump 14 for supplying such an accurately metered quantity of fluid herein takes the form of a variable displacement piston pump of novel construction. This pump comprises a plurality of annularly disposed parallelly arranged cylinders 30, each having a piston 31 reciprocable therein which in all positions has one end projecting from the cylinder. The pistons 31 are actuated by a wobble plate 32 swiveled on a ball 33 and having an arm 34 projecting centrally of the cylinders into a socket 35 formed in the end of a drive shaft 36 oblique to the axis thereof. The pistons 31 merely abut the wobble plate 32 and are not positively connected thereto so that the wobble plate is capable of imparting an exhaust stroke only to the pistons but is unable to impart a return or intake stroke thereto, thus making the pump non-self-priming. Each cylinder 30 has an intake port and an exhaust port with the intake port controlled by a check valve 37 functioning to permit flow of fluid into the cylinder but preventing return flow out of the cylinder and with the exhaust port controlled by a check valve 38 which functions to permit discharge from the cylinder but to prevent return flow into the cylinder. All of the intake ports open into a charging passage 39 communicating with the passage 25, and all of the exhaust ports open to a supply passage 40. Shaft 36 also drives the gear pump 13.

The displacement of the pump 14 may be varied by changing the stroke of the pistons 31 and this is accomplished by relatively axial adjustment of the wobble plate 32 and the shaft 36. Such relative adjustment varies the extent to which the arm 34 is received in the oblique socket 35 thereby varying the throw of the wobble plate. This is accomplished by movement of the wobble plate 32, and to that end the ball 33 upon which the wobble plate is swiveled is formed on the end of a piston 41 slidable in the bore of a cylinder 42. The piston 41 may be manually set at a predetermined fixed displacement of the pump by means of cam rings 43 and 44 rotatable on the cylinder 42. To that end, there is secured diametrically of the piston 41 a rod 45 projecting through longitudinal slots 46 in the cylinder and between the rings 43 and 44. By rotation of the rings 43 and 44, the piston 41, by engagement of the rings with the rod 45, may be set in a predetermined position to obtain a fixed predetermined displacement of the pump. The rings 43 and 44 have worm teeth formed on their periphery and may be rotated by worms having knobs 47 and 48 (see Fig. 1) disposed outwardly of the casing 12 for convenient adjustment of the displacement of the pump.

The displacement of the pump 14 may also be varied automatically by supplying fluid pressure to the end of the cylinder 42 through a port 49 which is an external port threaded for the reception of a conduit. When the displacement of the pump is to be varied automatically, the rings 43 and 44 are employed merely to limit the movement of the piston 41 and thus predetermine the maximum and minimum displacement to which the pump may be shifted automatically. The rings 43 and 44 are then rotated to permit movement of the piston 41 and to provide stops against which the rod 45 abuts in either the inward or the outward movement of the piston 41. Ring 43 determines the maximum displacement of the pump, and the piston 41 is normally urged to the limit permitted by the ring 43 by the reaction of the fluid in the cylinders 30 on the pistons 31, while ring 44 determines the limit of inward movement of the piston 41 under the pressure supplied through the port 49 and determines the minimum displacement of the pump. The manner in which the fluid is supplied to the cylinder 42 will be described hereinafter.

Having described briefly the pumps constituting the pumping mechanism, the governing mechanism for controlling the functioning of the pumping mechanism and the volume, direction and pressure of discharge of fluid from the device 11 will now be described. As previously stated, the volume of discharge is controlled by valve means generally designated 15 and this means is composed of three independently operable valves disposed in a bore 55 extending transversely of the casing 12 and intersecting the passage 25 to which the gear pump 13 discharges. Immediately adjacent and on opposite sides of the passage 25, the bore 55 is formed with an annular groove 56 and an annular groove 57. Both grooves 56 and 57 communicate with a large passage 58 terminating in a return port 59 formed in the casing 12 opposite the intake port 22 and threaded for the reception of a return pipe 60 leading to the reservoir 20.

Figure 2:
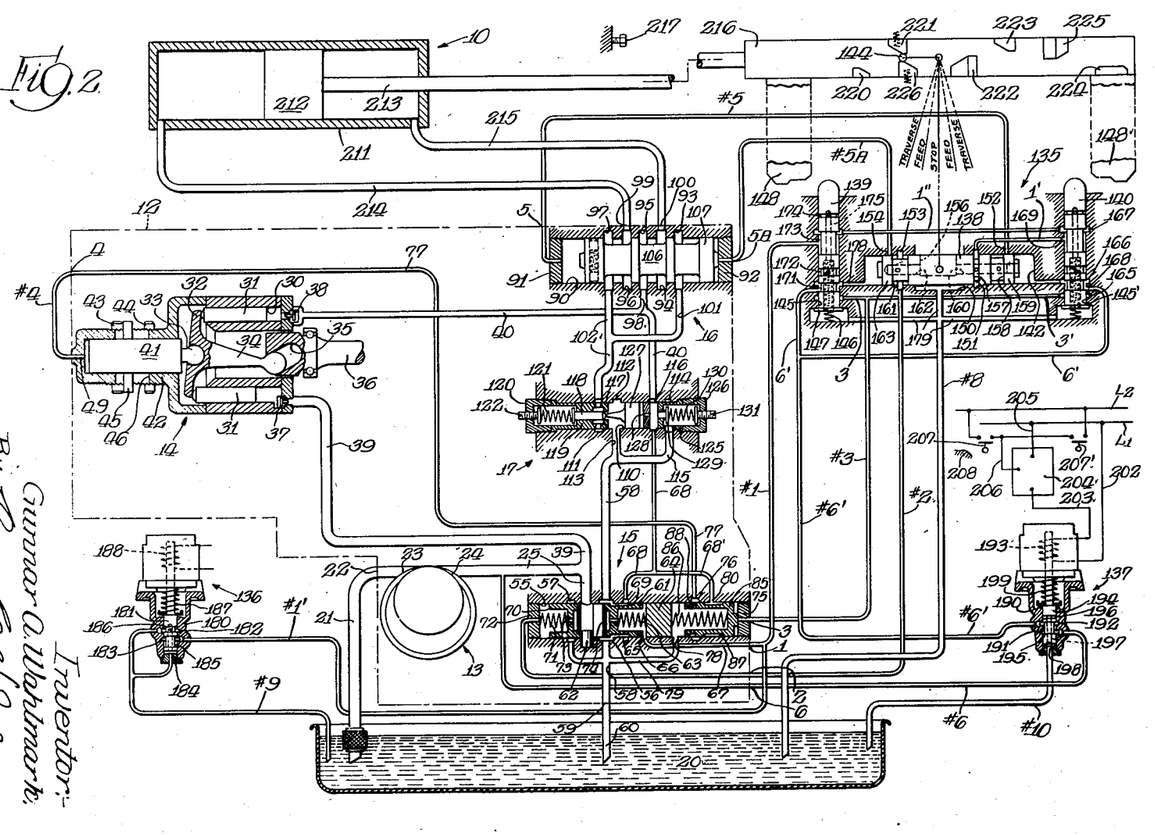
Fig. 2 is a schematic diagram of the hydraulic circuit shown in Fig. 1.

Flow of fluid from the passage 25 to the groove 56 is controlled by a valve 61 in the form of a hollow piston which functions as a start and stop valve as will later become more apparent. The valve 61 has two positions, namely, an open position as shown in Fig. 2 in which flow is permitted from the passage 25 to the groove 56 and a closed position determined by abutment of the valve with a plug 62 in which the head or closed end of the valve projects into the opening between the passage 25 and the groove 56 to prevent flow therethrough. The valve is normally urged to its closed position by means of a light compression spring 63 which is disposed within the valve with one end abutting the closed end of the valve and the other end abutting a plug 64 having a fluid-tight fit in the bore 55. Intermediate the groove 56 and the plug 64, the bore 55 is formed with a second smaller annular groove 65 and immediately adjacent the plug 64 a port 66 opens to the bore. By means of a passage 67, port 66 is connected to a first external control fluid port 1 threaded for the reception of a conduit, while groove 65 is connected by a duct 68 to the supply passage 40. Port 66 is always open and is not controlled by the valve 61, but groove 65 is controlled by valve 61 and to that end the valve is formed with an external annular groove 69 which is of such width and is so positioned on the valve as to effect communication between the groove 65 and the groove 56 when the valve is in open position but to close the groove 65 when the valve is in closed position. Duct 68 provides an escape for slippage fluid when the device 11 is not discharging fluid.

Communication between the passage 25 and the groove 57 likewise is controlled by a valve 70 in the form of a hollow piston, similar to the valve 61, which functions as a rate change or charging valve. This valve also has two positions, namely, a closed position in which the head end of the valve projects into the opening between the passage 25 and the groove 57 to prevent flow of fluid therethrough, which position is determined by abutment with the plug 62, as shown in Fig. 2, and an open position shifted to the left in Fig. 2, in which flow is permitted from the passage 25 to the groove 57. The valve is urged to its closed position by a heavy compression spring 71 substantially stronger than the spring 63, having one end abutting the closed or head end of the valve 70 and the other end abutting a cap 72 closing one end of the bore 55. The cap 72 is provided with a second external control fluid port 2 threaded for the reception of a conduit.

Each of the valves 61 and 70 is formed at its closed or head end with a small opening 73 to permit bleeding of fluid from passage 25 to the interior of the valve. This opening preferably is covered by a screen 74 to prevent clogging of the opening by foreign material.

As stated, the valve 61 functions as a start and stop valve, while the valve 70 functions as a rate change or charging valve. The strength of the spring 63 controlling the valve 61 is such that the valve normally maintains a low pressure in the passage 25, which is insufficient to open the intake check valves 37 of the variable displacement pump 14 and impart a return stroke to the pistons 31 thereof. Thus, when the valve is controlled by the spring 63 only, no discharge from the device 11 takes place for the valve 61 is opened by the low pressure of the fluid in the passage 25, thereby permitting escape of the fluid through the groove 56, passage 58, and out through the return pipe 60. Spring 71 of valve 70 maintains a pressure in the passage 25, which may approximate 75 pounds, but in all events is sufficient to open the intake check valves 37 and impart a return stroke to the pistons 31 of the variable displacement pump 14. Thus, when controlled by the spring only, valve 70 functions to charge the pump 14, any excess of fluid being returned to the reservoir through passage 58 and pipe 60. Each or both of the valves 61 and 70 may be positively held in closed position by blocking the escape of the hydraulic fluid bleeding into the valves through the openings 73 formed in the end thereof. It will readily be understood that by blocking the escape of fluid bleeding through the opening 73 the pressure on opposite sides of the valve will be equalized, thus enabling the respective spring positively to close the valve. When valve 61 is positively held closed, discharge takes place from the device 11 as determined by the valve 70. If valve 70 is then closed only by spring 71, the valve functions to charge the pump 14 and the volume of discharge is low as determined by the displacement of the feed pump 14, but if valve 70 is positively closed, the volume is large as determined by the displacement of the traverse pump 13.

At its right end, the bore 55 is closed by a cap 75 having a third external control fluid port 3 opening therethrough and threaded for the reception of a conduit. An annular groove 76 opens to the bore 55 and communicates with a duct 77 which terminates in an external port 4 threaded for the reception of an external conduit #4 leading to the port 49 of the means for varying the displacement of pump 14. The end of the bore opposite the cap 75 is adapted to be connected to the reservoir to permit the exhaust of fluid returned through duct 77 and to that end is here shown formed with a port 78 connected by a duct 79 to the passage 58. Also opening to the bore 55 is a port 80 connected by a branch 68' of duct 68 to passage 40 for supplying high pressure fluid to the bore.

Reciprocable in the right end of the bore 55 is a valve 85, in the form of a hollow piston, controlling the supply of fluid to the means for varying the displacement of the variable delivery pump 14. The valve is yieldably urged to the right to the position shown in Fig. 2 by a compression spring 86 received in the valve and acting between the closed end of the valve and the plug 64. The valve is formed intermediate its ends with an annular external groove 87 and with radial apertures 88. These are so located that with the valve in the position shown, the port 80 is closed but the apertures 88 register with the groove 76 to permit discharge to the passage 79 and thence to the reservoir of any fluid returned through the duct 77. However, when fluid pressure is applied to the right end of the valve through the port 3, the valve is shifted to the left and the groove 87 serves to connect the port 80 with the groove 76 to supply high pressure fluid to the cylinder 42.

To accommodate the valve means, generally designated 16, controlling the direction of fluid discharge from the unitary device 11, the casing 12 is formed near the top with a transversely extending bore 90, closed at one end by a cap 91 and at the other end by a cap 92. Cap 91 has formed therein a fifth external control fluid port 5 threaded for the reception of a conduit, and cap 92 has a similar port 5A. Substantially midway between its ends, the bore 90 has opening thereinto five annular and axially spaced grooves 93, 94, 95, 96, and 97. The intermediate one of these grooves 95 communicates by means of a large passage 98 with the supply passage 40. The grooves 96 and 94 on opposite sides of the groove 95 communicate respectively with large external ports 99 and 100 threaded for the reception of conduits leading to the hydraulic motor to be supplied with fluid. End groove 93 is connected by a passage 101 and a passage 102 to end groove 97 and to the valve means controlling the return fluid, as will presently be described.

Reciprocable in the bore 90 to control the various grooves, is a spool valve 106 provided with four lands 107, all spaced axially a distance embracing two grooves. The valve has two positions, namely, that shown and one wherein it is shifted to the other end of the bore. It will be seen that in the position shown, grooves 94 and 95 are bridged so that the discharge from the variable delivery pump 14 is directed to the port 100, while grooves 96 and 97 are also bridged so that the return fluid entering through port 99 may be directed to the return fluid controlling valve means through passage 102. When shifted to the left, groove 95 is then connected to groove 96 while groove 94 is connected to groove 93 to reverse the direction of discharge and return of fluid from and to the ports 99 and 100.

To accommodate the remaining valve means 17, the casing 12 is formed with a transversely extending bore 110 disposed intermediate the bore 55 and the bore 90. The bore 110 has opening thereinto an annular groove 111 into which opens passage 102 communicating with the end grooves 93 and 97 of the reversing valve means. An annular groove 112 to the right of the groove 111 communicates by means of a passage 113 with the passage 58 and return port 59, and an annular groove 114 at the extreme right end of the bore also communicates by means of a passage 115 with the passage 58. Also opening to the bore 110 is a groove 116 communicating with the supply passage 40 of the variable delivery pump 14.

Interposed between the grooves 111 and 112 and suitably ported to communicate with the groove 111 is a centrally apertured member 117 forming a seat for a valve 118 controlling the return fluid. The valve 118 is slidably supported in a tubular member 119 received in the left end of the bore 110 and retained therein by means of a hollow cap 120 threaded into the end of the bore. Urging the valve 118 to seated position is a compression spring 121 which at one end bears against a flanged washer on the stem of the valve 118 and at the other end bears against a washer swiveled on the end of an adjusting screw 122.

It will be apparent that the valve 118 is not responsive to the pressure of the return fluid in the passage 102, and to actuate the valve 118, means is provided which is responsive to the supply fluid pressure only. Accordingly, there is received in the right end of the bore 110 a tubular member 125 retained in the bore by means of a hollow cap 126 threaded into the bore. The member 125 is suitably apertured to provide communication between the passage 115 and the interior of the member and is also apertured to provide communication between the interior of the member and the groove 116 communicating with the fluid supply passage 40. Interposed between the member 117 and the member 125 is a piston 127 having a point engaging the end of the valve 118 for the purpose of shifting the valve upon actuation of the piston 127. To subject the piston 127 to the supply pressure, but to prevent shifting thereof due to slight changes in pressure, the closed end of the member 125 is formed with a small bleed opening 128. Preferably, a screen (not shown) is positioned over the bleed opening to prevent foreign material from entering and clogging the same. It will be seen that the valve 118 and the piston 127 being responsive only to the supply pressure function as a circuit locking means and as a low pressure limit means. To the right of the apertures registering with the groove 116, the member 125 is formed to provide a seat for a disk valve 129 which serves as a relief valve. The valve is urged to seated position by means of a heavy compression spring 130 which abuts against a washer resting on an adjusting screw 131 threaded into the cap 126. This valve is adjusted to open only at extremely high pressures for the purpose of avoiding injury to the system. It constitutes a high pressure limit.

The remote control means comprises pilot valve means generally designated 135 adapted to be actuated manually and automatically actuated by dogs on the table, an electric solenoid controlled temporary stop valve means 136, and an electrically controlled dwell valve means 137. The pilot valve means 135 is composed of a main valve 138, which determines the direction and rate of movement of the table, and two identical auxiliary valves 139 and 140, which control fluid for shifting the valve 138 from one side of neutral to the other and for shifting valve 85, all housed in a single casing 141. Valve 138 is reciprocable in a bore 142 extending longitudinally of the casing 141 and has a central or neutral "stop" position which is the position shown, and two positions on either side of neutral with the extreme position in each instance representing a "traverse" position, and the intermediate position representing a "feed" position. The valve 138 may be shifted to its five positions either manually by manipulation of a handle 143 (see Fig. 1) at the front of the casing 141, or automatically by engagement of suitably shaped and positioned dogs, moved in timed relation with the table, with a follower 144 at the rear of the casing. The valves 139 and 140 are reciprocable in bores 145 and 145' respectively extending transversely of the casing 141 and projecting outwardly of the bore at the rear of the casing into position for engagement with suitably positioned dogs, here shown as compound dogs 148, moved in timed relation with the table. Each of the valves 139 and 140 is urged outwardly of its bore by means of a compression spring 146 received partially within the valve with the outward movement of the valve arrested by a flange 147 formed on the inner end thereof.

Intermediate its ends, the bore 142 is formed with a wide groove 150, and to the right of the groove 150 is a narrow annular groove 151 and still farther to the right a port 152. To the left of the groove 150 is a narrow annular groove 153 and farther to the left is a port 154 spaced a lesser distance from the groove 153 than is the port 152 from the groove 151. The valve 138 is formed with a central recess 156 for the reception of the means connecting the valve to the handle 143 and follower 144, which recess, of course, also is in communication with the wide central groove 150. To the right of the recess 156, the valve 138 is formed with a narrow annular groove 157 which registers with the groove 151 when the valve is in neutral or "stop" position but which is out of registry with the groove 157 in all other positions of the valve so that the groove 151 is blocked. To the right of the groove 157 is a wider groove 158 having one side wall defined by a land 159 which in the "stop" position shown blocks the port 152. With the valve shifted to the right to either "feed" or "traverse" position, groove 158 registers with the port 152. Each of the grooves 157 and 158 is connected by a radial port to an axial passage 160 opening to the recess 150.

To the left of the recess 156, the valve 138 is formed with an annular groove 161, which communicates by means of a radial port and an axial passage 162 with the recess 156, and with a land 163 at the extreme end of the valve. In the "stop" position shown, groove 161 registers with the groove 153, while the land 163 blocks the port 154. When the valve is shifted to the left to "feed" position, groove 161 bridges both the groove 153 and port 154, while in "traverse" position groove 153 is blocked but port 154 is still bridged by the groove 161. The outer end of each of the passages 160 and 162 is closed with the end lands 159 and 163 serving as pistons by means of which the valve may be shifted hydraulically.

As previously stated, the valves 139 and 140 are identical, with the valves reciprocating respectively in bores 145 and 145' which also have identical porting and grooving, and each of which is somewhat enlarged at its inner end to accommodate the flange 147 on the valve. Each bore is formed with an annular groove 165, spaced outwardly a short distance from its enlarged inner end, an annular groove 166 spaced from the groove 165 approximately the same distance that the groove 165 is spaced from the enlarged inner end of the bore, and an annular groove 167 spaced outwardly a substantially greater distance. Opening to the bore intermediate the grooves 165 and 166 is a port 168, and opening to the bore adjacent the groove 167 is a port 169.

The valves 139 and 140 are each formed with narrow annular grooves 171 and 172 closely spaced and a wide annular groove 173. At the extreme outer end, each valve is formed with a leakage groove 174 communicating by means of a radial port with an axial passage 175 opening through the inner end of the valve to the enlarged end of the bore. The groove 172 also is formed with a radial port opening to the axial passage 175. The exact size and spacing of the grooves and ports is such that in the normal position of the valves shown, the groove 165 in the bore is blocked, while groove 171 of the valve bridges the port 168 and the groove 166, and while groove 173 of the valve bridges port 169 and groove 167. When a valve is shifted half way in, which is its "slow feed" position, port 168 and groove 165 of the bore are bridged by the groove 171 of the valve while grooves 166 and 167 are now blocked. When the valve 139 or 140 is shifted all the way in, which is its "reverse" position, groove 172 of the valve registers with groove 166 of the bore, while groove 167 is blocked and communication between port 168 and groove 165 is disrupted.

Certain of the grooves and ports opening to the bores in the pilot valve means, just described, are connected by ducts and passages formed within the casing 141 of the pilot valve means, while the remaining grooves and ports are connected by external conduits to the external ports of the unitary pressure generating and control device 11 for the purpose of controlling the same to obtain a desired cycle of movement of the table. Accordingly, external port 1 of the device 11, which port governs the start-stop valve 81, is connected by a conduit #1 to the port 169 of the bore 145. The corresponding port of the bore 145' is connected by a duct 1' to groove 151 of bore 142 and the grooves 167 adjacent the ports 169 are connected by a duct 1". It will be apparent from the foregoing that the #1 conduit is controlled by the auxiliary valves 139 and 140 as well as by the main valve 138. External port 2 of the unitary device 11, which governs the charging or rate change valve 70, is connected by an external conduit #2 to the groove 153 of the bore 142 to be controlled solely by the main valve 138. The external port 3 of the unitary device 11 which controls the slow feed valve 85 is connected by an external conduit #3 and branch duct 3 and 3' constituting internal extensions of the conduit #3 with the groove 165 of each of the bores 145 and 145'. The reversing valve 106 is controlled by the pilot valve means through an external conduit #5 leading from the external port 5 of the device 11 to the port 152 of the pilot valve means and by a conduit #5A leading from the external port 5A to the port 154 of the pilot valve means. Each of the grooves 166 is connected by a passage 178 to the adjacent end of the bore 142, while the ports 168 adjacent the grooves 166 are connected by branch passages 6' and an external conduit #6' to an external conduit #6 connected to the external port 6 to receive control fluid. The passages within the pilot valve are completed by branch passages 179 communicating with the groove 150 and with the enlarged portion of the bores 145 and 145' and converge into a single external conduit #8 leading to the reservoir 20. It will be seen from the foregoing that valve 138 is in hydraulic balance in all of its positions so long as the valves 139 and 140 are in normal position, but that shift of either valve 139 or 140 to "reverse" position will unbalance the fluid pressure on valve 138 and cause the same to be shifted.

As previously stated, the remote control means includes an electric solenoid controlled temporary stop valve means 136. This valve means comprises a casing 180 having a bore therein in which is shiftable a valve 181. The casing is formed with two annular, axially spaced grooves 182 and 183 and a port 184 opening to the end of the bore. The valve 181, in turn, is formed with a wide annular groove 185 capable of bridging the grooves 182 and 183 and with a narrow annular groove 186 which communicates by means of a radial port with an axial passage opening through the lower end of the valve to the bore in the casing. Groove 183 is connected to an external conduit #1', constituting a branch of the conduit #1, and groove 182 and port 184 are connected by a conduit #9 and branches thereof to the reservoir 20. The valve has two positions, namely that shown, to which it is urged by a compression spring 187 and in which communication between the conduit #1 and the conduit #9 is disrupted, and a position which it assumes when a solenoid 188 is energized in which the groove 185 bridges the grooves 183 and 182 to connect the conduits #1' and #9. One or more push button switches for controlling the valve means 136 are distributed in well known manner at strategic points about the machine with which the circuit is associated to enable an operator to arrest the operation of the machine should an emergency or other occasion arise.

The remote control means also includes an electrically controlled dwell valve means 137. In the form shown in Fig. 2, this valve means comprises simply a casing 190 having a bore therein and opening into the bore an annular groove 191 and an annular groove 192. Shiftable in the bore by means of a solenoid 193 is a valve 194 having a wide annular groove 195 capable of bridging grooves 191 and 192 and a narrow leakage arresting groove 196 communicating by means of radial ports with an axial passage 197 opening through the lower end of the valve to the bore. The valve means is intended to be interposed in the external conduits #6 and #6' and accordingly has the groove 191 connected to the conduit #6 and the groove 192 connected to the conduit #6'. A port 198 opening to the end of the bore is connected by a conduit #10 to the reservoir 20. The valve has two positions, namely, that shown, to which it is urged by a compression spring 199, in which the groove 195 bridges the grooves 191 and 192 so as to permit unrestricted flow of fluid through the conduits #6 and #6', and a shifted position, resulting from the energization of the solenoid 193, in which the groove 191 is blocked to interrupt communication between the conduits #6 and #6'.

It may be seen from the foregoing that a shift of valve 139 or valve 140 to its "reverse" position will condition a circuit for reversing the reversing valve 106 but that the control fluid effecting such reversal is also under the control of the valve means 137. The valve means 137 is accordingly adapted to be electrically controlled to result in a predetermined dwell of the table prior to reversal and accordingly one end of the solenoid 193 is connected by lead 202 to a line wire L1, while the other end is connected by a lead 203 to one terminal of a definite time relay 204. A second terminal of the definite time relay is connected by a lead 205 to the line wire L1, while a third terminal is connected by a lead 206 to one fixed contact of each of two switches 207 and 207', the remaining fixed contacts of which are connected to a line wire L2, so as to place the switches in parallel. These switches are normally open and are adapted to be closed just prior to engagement of the table with a positive stop by suitably positioned dogs 208 moving in timed relation with the movement of the table. The definite time relay functions and is adjustable to maintain the solenoid 193 energized for any desired length of time after closure of one of the switches 207 and 207' and thus serves to disrupt communication between the conduits #6 and #6' during that period.

In Fig. 3 there is disclosed a modified form of dwell valve means 137' which has a casing 190' having a bore formed therein and opening into the bore a narrow annular groove 191', a narrow annular groove 192', and a third narrow annular groove 210, all spaced axially the same distance. Shiftable in the bore by means of a solenoid 193' is a valve 194' formed with a wide external annular groove 195' and a narrower annular groove 196' communicating by means of a radial port with an axial passage 197' opening through the lower end of the valve to the bore in the casing. Opening to the lower end of the bore is a port 198' adapted to be connected by a conduit #10' with the reservoir 20. Groove 195' of the valve is wide enough to bridge adjacent two of the grooves 191', 192', and 210, and in the normal position of the valve, shown in Fig. 3, to which it is urged by a compression spring 199', groove 195' bridges grooves 191' and 192', while groove 196' registers with groove 210. When the valve is shifted upwardly by energization of the solenoid 193', groove 191' is blocked and groove 195' in the valve bridges grooves 192' and 210.

When the valve means 137' is to be employed in place of the valve means 137, the solenoid 193' thereof is connected to the electrical control circuit in the same manner as was the solenoid 193. Likewise, grooves 191' and 192' are connected to the conduits #6' and #6. Groove 210, however, is adapted to be connected to the conduit #3, while the port of the pilot valve means to which the conduit #3 normally is connected is plugged. By virtue of the groove 210 and its connection with the conduit #3, the valve means 137' in addition to determining the length of dwell functions to shift the slow feed valve 85 and thus reduces to a minimum the displacement of the pump 14 during the dwell period.

The hydraulic circuit is completed by the hydraulic motor 10 which herein is of the reciprocable type and comprises a cylinder 211 and a piston 212 reciprocable therein and adapted to be connected by means of a piston rod 213 with the table to be actuated. The head end of the cylinder 211 is connected to the port 99 of the device 11 by a conduit 214 while the rod end is connected by a conduit 215 to the port 100.

The flow of fluid through the circuit and the functioning of the pumping and valve means is best understood from a brief description of the operation of the circuit. While the circuit disclosed herein is of such extremely flexible nature that by the employment of suitably shaped and positioned dogs, almost any cycle desired could be obtained, the operation here described will be that resulting in a cycle, the first half of which includes "traverse" right, "fast feed" right, "slow feed" right, "dwell" and reverse, return "traverse" to neutral or central position, and "stop." The second half of the cycle includes "fast feed" left, "traverse" left, "fast feed" left, "slow feed" left, "dwell" and reverse, "fast feed" return and "traverse" return to central or neutral position of the table, and "stop." A table has been represented at 216 and a positive stop at 217.

Let it be assumed, therefore, that the pilot valve means is in "stop" or neutral position and that the table also is in neutral position, and that the other valves are in the positions shown in Fig. 2. With the valves as shown in Fig. 2, conduit #1 would be open to the reservoir 20 through the auxiliary valves 139 and 140 and the main valve 138 so that no pressure would build up in the conduit #1 causing the valve 61 to be urged to closed position only by spring 63. As a result, even though the pumps 13 and 14 are operating, no fluid is being discharged to the motor 10 because the pressure maintained by the valve 61 under those conditions is not sufficient to charge the pump 14 so that all of the fluid supplied by the pump 13 is returned to the reservoir 20 through the passage 25, groove 56, passage 58, and pipe 60.

To initiate operation of the table to the right at a "traverse" rate, the main valve 138 is shifted to its extreme right position ("traverse right") by manipulation of the handle 143. In this position of the valve 138, the groove 151 is blocked with the result that fluid pressure will build up in the conduit #1 and will positively retain the valve 61 in closed position, preventing any further discharge of fluid to the reservoir from the passage 25 through the groove 56. Likewise, the groove 153 is now blocked thereby causing pressure to build up in conduit #2 with the result that the rate change valve 70 also is positively closed. With both valve 61 and valve 70 positively closed, the pressure built up in the passage 25 and the charging passage 39 is sufficient to open both the intake valves 37 and also the exhaust valves 38 of the pump 14, so that the entire discharge of the traverse pump 13 flows through the pump 14 and is discharged to the groove 95 of the reversing valve means.

The reversing valve 106, by the same movement of the valve 138, has been shifted to its extreme left position by fluid pressure discharged through the port 5A by means of a conduit #5A communicating at its other end with the port 154 of the pilot valve means. In the "traverse right" position of the main valve 138, port 154 is open to the end of the bore 142 which in turn is filled with fluid under pressure supplied by the conduits #6 and #6'. Port 152 of the pilot valve is now open to the reservoir 20 through the axial passage 160 so that fluid in the left end of the bore 90 of the reversing valve means is free to discharge through the conduit #5 when the valve is shifted by the application of fluid pressure at its right end. With the valve 106 in its left position, grooves 95 and 96 are bridged so that operating fluid is directed to the head end of the motor 10 to drive the piston 212 to the right, while grooves 93 and 94 are bridged so that return fluid from the rod end of the motor is discharged through ducts 101 and 102 to the valve 118. Valve 118 is controlled by piston 127 in response to the pressure of the supply fluid transmitted through 40, 116 and 128 to permit discharge of the return fluid through passage 58 in conduit 60.

Movement of the table to the right at a traverse rate will continue until the valve 138 is shifted to its "feed right" position by engagement of a dog 220, suitably positioned and moving in timed relation with the table, with the follower 144. In this position of the valve 138, groove 153 with which the conduit #2 communicates is open to the reservoir through the axial passage 162 and conduit #8 so that there no longer is any building up of fluid pressure tending to maintain the rate change valve 70 positively closed. Groove 151, however, is still blocked so that valve 61 is still positively closed by the spring 63 due to the equalization of the fluid pressure on opposite sides of the valve because pressure is built up in the conduit #1. The pressure now maintained in the passages 25 and 39 is that determined by the spring 71 of the charging valve 70, which pressure is sufficient to open the intake valves 37 and impart a return stroke to the pistons of the pump 14 but is insufficient to open the exhaust valves 38. As a result, the valve 70 now functions to charge the pump 14 which pump in turn now functions to boost the pressure and to meter the quantity of fluid supplied to the motor 10 so as to obtain a precise movement of the table at a feed rate. Fluid supplied by pump 13 in excess of that metered by pump 14 is discharged past valve 70 to passage 58 and out to the reservoir. With the valve 138 in "feed right" position, port 154 still communicates with the end of the bore 142, while port 152 is still connected to the tank through the passage 160 so that no shift of the reversing valve 106 takes place, with the result that the direction of movement of the table is still to the right.

After a predetermined movement of the table to the right at a "fast feed" rate, the compound dog 148 at the left end of the table comes into play and engages the valve 139 to shift it in half way to its "slow feed" position. In this position of the valve 139, port 168 is connected to groove 165 with the result that fluid pressure is applied to the slow feed valve 85 through the conduit #3. As a result, the valve 85 is shifted to the left as viewed in Fig. 2 causing groove 87 thereof to bridge port 80 and groove 76. High pressure fluid from the pump 14 is now supplied to the cylinder 42 through the passage 40, conduits 68 and 68', port 80, grooves 87 and 76, duct 77, and conduit #4 to the port 49. By the application of such high pressure fluid to the piston 41, the wobble plate 32 of the pump is shifted inwardly to the extent permitted by the previously adjusted ring 44 with the result that the displacement of the pump 14 is reduced to the preselected minimum. The smaller quantity of fluid supplied to the motor 10 now drives the table at a "slow feed" rate and still to the right, for shift of the valve 139 has in no way affected the valve 138 or the reversing valve 106.

Following the "slow feed" movement, three operations occur in rapid succession and in the order named. First, a dog 208 closes the switch 207 to cause the definite time relay 204 to function and thereby energize the coil 193 and shift the dwell valve means 137. Second, the compound dog 148 which shifted the valve 139 to its "slow feed" position now shifts the valve the remainder of the distance inwardly to its "reverse" position. And third, the table engages a positive stop to arrest the movement thereof. With the valve 139 in its reverse position, groove 172 thereof now registers with groove 166 in bore 145, thereby placing the left end of the bore 142 in communication with the reservoir through the duct 178, radial port in the valve 139, axial passage 175, duct 179 and conduit #8. It will be apparent that the valve 138, which heretofore had been in hydraulic balance, is now unbalanced because the left end of the bore 142 is connected to the tank as previously described and is, therefore, at atmospheric pressure, while the right end of the bore 142 is still connected to the pressure conduit #6' through the grooves 166 and 165 of the bore 145' which are bridged by the groove 171 of the valve 140. No shift of the valve 138 takes place immediately, however, because communication between the conduit #6 and the conduit #6 has been interrupted by the shift of the valve means 137, with the result that the table is now in dwell.

The length of the dwell is determined by the setting of the definite time relay 204 and continues until the solenoid 193 is again deenergized. When the solenoid is deenergized, the valve 194 is returned to its normal position by the spring 199 thereby again effecting communication between the conduit #6 and the conduit #6'. Fluid pressure is then supplied to the right end of the bore 142, while the left end is still connected to the tank as previously described, with the result that the valve 138 is shifted to its extreme left position which is known as "traverse left." With the valve 138 in its extreme left position, port 152 is now connected to the conduit #6 through the passage 178, groove 171 of the valve 140, port 168, branch passage 6' and conduit #6', while port 154 is now connected to the reservoir through the radial port and axial passage 162. The result is that the reversing valve 106 is shifted to the right to the position shown in Fig. 2 thereby connecting groove 95 with groove 94 and groove 96 with groove 97 to supply fluid to the rod end of the motor 10 for effecting movement of the table to the left. With the valve 138 in its extreme left position, groove 153 with which conduit #2 communicates is again blocked with the result that pressure is built up positively holding the valve 70 closed. The entire output of the traverse pump 13 is then supplied to the motor, as was previously described in connection with the traverse movement of the table to the right, to effect a traverse movement of the table to the left. This traverse movement to the left continues until the table is returned to its neutral position, at which time a stop dog 221 engages the follower 144 and shifts the valve 138 to "stop" position.

When the operator of the machine is ready to initiate the second half of the cycle, which is to start at a "fast feed" rate of movement, he grasps the handle 143 and shifts the valve 138 to the left to its "feed" position. Since the reversing valve 106 already is in a position for directing the fluid to the motor 10 in a manner to effect a movement of the table to the left, no shift of the valve 106 takes place. Just as in its "feed" right position, valve 138 blocks the groove 151 so as to cause fluid pressure to build up in the conduit #1, while groove 153 is open to the reservoir so that no fluid pressure is built up in the conduit #2. As a result, a small quantity of fluid is supplied to the motor 10 as metered by the pump 14 with the result that the table is driven to the left at a feed rate.

After a predetermined feed movement to the left, a rapid traverse dog 222 engages the follower 144 to shift the valve 138 to its extreme left or "traverse" left position with the result that port 153 is blocked and pressure is built up positively closing the valve 70. Thus, as previously described for that same condition, the entire discharge of the traverse pump 13 is now supplied to the motor 10 with the result that the table is now driven at a traverse rate to the left. Such traverse rate of movement to the left continues until a feed dog 223 engages the follower 144 to return the valve 138 to its "feed" left position. At the appointed time, the compound dog 148 engages valve 140 to move it inwardly in two steps and the dog 208 at the right end of the table engages the switch 207' to obtain the "slow feed" movement, "dwell" and reverse, as explained in the description of the first half of the cycle.

In the second half of the cycle, however, reversal is from "feed" left to "feed" right as distinguished from feed to traverse as was effected in the first half of the cycle. Such reversal from "feed" to "feed," in fact, any reversal be it from feed to traverse or feed or from traverse to traverse or feed, is obtained in the same manner as a reversal from feed to traverse by the simple addition of a suitably positioned dog, herein a return feed dog 224 which functions to arrest the valve 138 in its "feed" right position instead of permitting the valve to be shifted to its "traverse" right position as is normally the case. Upon shift of the valve 138 to its "feed" right position, the table is again driven to the right to return it to its neutral position. This may be effected by employing a feed rate the entire distance, or a rapid traverse dog 225 may be employed to shift the valve 138 to "traverse" position. The table is again brought to rest at its central position by engagement of a stop dog 226 with the follower 144 shifting the valve 138 to "stop" position. It is believed apparent from the foregoing that any desired cycle of operation of the table might be obtained. Thus, by eliminating the stop dogs 221 and 226, the cycle might be made continuous, and by the insertion of suitable feed and rapid traverse dogs, the cycle might include as many changes from feed to traverse or vice versa as might be desired. By elimination of a feed dog, fast feed might be eliminated and only slow feed employed, and by a change in the compound dogs 148, slow feed might be eliminated.

Should it become necessary or desirable at any point in the cycle to arrest the operation of the machine temporarily, this is readily done by energizing the solenoid 188 of the valve means 136. The resulting shift of the valve 181 will then cause the grooves 182 and 183 to be bridged so that conduit #1' and conduit #9 are connected. This will relieve the pressure in the conduit #1 and place the valve 61 solely under the control of the spring 63 with the result that no fluid will be discharged to the motor 10. As soon as the solenoid 188 is again deenergized, fluid pressure will build up in the conduit #1 again positively closing the valve 61 to cause the table to be advanced at the same rate and direction as at the time of interruption.

Should it be found desirable to substitute the dwell valve means 137' for the valve means 137, this may readily be done as previously described. When the dwell valve means 137' is employed, the compound dogs 148 are usually eliminated, though not necessarily, and single reversing dogs substituted. Under those circumstances, the slow feed is usually eliminated, with the table coming all the way up to the positive stop at fast feed and with the displacement of the pump 14 subsequently reduced to a minimum so as to have a small discharge while the table is at rest against the positive stop. The valve means 137' controls the conduits #6 and #6' in the same manner as does valve means 137, namely, it provides free communication between the conduits when the valve is in normal position and serves to disrupt communication when the solenoid 193' is energized, as a result of the closure of one of the switches 207 or 207'. Shift of the valve core 194', however, not only functions to disrupt communication between the conduit #6 and the conduit #6' but also functions to connect the conduit #6 to the conduit #3 to shift the slow feed valve 85 to reduce the displacement of the pump 14 whenever the dwell valve is energized.

It is believed apparent from the foregoing that I have provided an unusually flexible hydraulic circuit which is readily adaptable, by the employment of suitably shaped and positioned dogs, to obtain almost any cycle of movement desired. Outstanding among the features of the circuit is the possibility of obtaining feed movement in two directions, the ability to reverse from feed movement in one direction to feed movement in the other direction, the ability to obtain dwell at either end of movement of the table by simple mechanism requiring but a single valve, the reduction of the displacement to a minimum during the dwell period, and the novel construction of the pilot valve means.

By way of explanation, it is pointed out that stop dogs 221 and 226 are yieldably mounted to provide sufficient resistance to shift the valve 138 to "stop" position but yielding when the valve is manually shifted out of "stop" position.

I claim as my invention:

1. In a hydraulic actuator system for driving a member at different rates and in opposite directions, in combination, a reservoir for storing the fluid to be circulated, a hydraulic motor operatively associated with the member to drive the same, a traverse pump and a feed pump, said traverse pump being operable to draw fluid from the reservoir and to discharge the same to said feed pump, hydraulically shiftable reversing valve means interposed between said feed pump and said motor for governing the direction of discharge of fluid to the motor, volume control valve means having a first adjustment in which all of the fluid discharged by the traverse pump is returned to the reservoir, a second adjustment in which a portion of the fluid discharged by the traverse pump is metered by the feed pump and discharged at increased pressure to the motor, the fluid supplied by the traverse pump in excess of that metered by the feed pump being returned to the reservoir, and a third adjustment in which all of the fluid discharged by the traverse pump is supplied to the motor, and pilot valve means for coordinating the position of said reversing valve means and the adjustment of said volume control valve means, said pilot valve means being capable of coordinating the reversing and volume control valve means to obtain feed or traverse rate of movement in both directions of movement of the member.

2. In a hydraulic circuit for driving a member at different rates and in opposite directions, in combination, a reservoir for storing the fluid to be circulated, a hydraulic motor associated with the member to drive the same, a constant displacement traverse pump and a variable displacement feed pump connected in series, said traverse pump being operable to draw fluid from the reservoir and discharge the same to said feed pump, a reversing valve means interposed between said feed pump and said motor to govern the direction of discharge of fluid from the pump to the motor, volume control valve means having a first adjustment in which no fluid is discharged to the motor, a second adjustment in which a quantity of fluid metered by the feed pump is discharged to the motor with the excess of fluid supplied by the traverse pump over that metered by the feed pump returned to the reservoir, and a third adjustment in which the entire output of the traverse pump is supplied to the motor, hydraulically actuable means for varying the displacement of the feed pump, hydraulically shiftable valve means for controlling the supply of hydraulic fluid to said displacement varying means, and a pilot valve means coordinating the reversing valve means, the volume control valve means and the displacement varying valve means, said pilot valve means being shiftable to a plurality of positions and operable to obtain feed and traverse movement of the member in either direction.

3. In a hydraulic actuator system for driving a member at different rates and in opposite directions, in combination, a hydraulic motor operatively associated with the member to drive the same, pumping mechanism operative to discharge fluid under pressure to the motor including a variable displacement feed pump, governing mechanism for controlling the volume and direction of fluid discharge by the pumping mechanism to the motor including a hydraulically shiftable valve governing the supply of fluid to the displacement varying means of the feed pump, and pilot valve means for controlling said governing mechanism to obtain different rates of movement of the member in opposite directions having a main valve with a neutral position and positions on either side of neutral for determining the rate and direction of movement of the member, said main valve normally being in hydraulic balance and duplicate auxiliary valves each having a first position for directing control fluid to said hydraulically shiftable valve means for varying the displacement of the feed pump, and a second position for unbalancing said main valve to effect a shift thereof changing the direction of movement of the member.

4. In a hydraulic actuator system for driving a member at different rates and in opposite directions, in combination, a reservoir for storing the fluid to be circulated, a hydraulic motor operatively associated with the member to drive the same, pumping mechanism operable to draw fluid from the reservoir and discharge the same under pressure to the motor comprising a variable displacement feed pump and a traverse pump, a hydraulically actuated means for varying the displacement of said feed pump, governing mechanism for controlling the volume and direction of fluid discharge from the pumping mechanism to the motor including valve means controlling the initiation of fluid discharge and whether it is at a feed or a traverse rate of discharge, valve means controlling the application of fluid to said displacement varying means, and valve means for determining the direction of fluid discharge to the motor, all of said valve means being hydraulically controlled, and remote control means for determining the cycle of movement of the member including pilot valve means and a plurality of conduits connecting said pilot valve means in controlling relation with the valve means of said governing mechanism, said pilot valve means comprising a main valve for coordinating the direction and volume controlling valve means to obtain movement of the member in either direction and at a feed or traverse rate and auxiliary valves operable to control the valve means governing the supply of fluid to the displacement varying means and the shift of the main valve for effecting reversal in the direction of movement of the member.

5. In a hydraulic circuit for driving a member at different rates and in opposite directions, in combination, a reservoir for storing fluid to be circulated, a hydraulic motor operatively associated with the member to drive the same, pumping mechanism operable to draw fluid from said reservoir and discharge the same under pressure to said motor including a variable displacement feed pump, governing mechanism for controlling the volume and direction of fluid discharge by said pumping mechanism to said motor including valve means for varying the displacement of the feed pump and valve means for determining the direction of fluid discharge to the motor, both said valve means being hydraulically controlled, and remote control means for controlling said governing mechanism to obtain a desired cycle of movement of a member including pilot valve means operable to precondition a circuit for shifting said direction control valve means, and a dwell control valve means hydraulically associated with said pilot valve means to control the flow of fluid thereto effecting the shift of the direction control valve means and hydraulically associated with the displacement controlling valve means and operable to cut off the supply of control fluid to the pilot valve means to delay shift of the direction controlling valve means for obtaining a dwell and simultaneously applying control fluid to the displacement controlling valve means to reduce the displacement of the pump to a minimum during the dwell.

6. In a hydraulic actuator system for driving a member at different rates and in opposite directions, a hydraulic motor operatively associated with the member for driving the same, pumping mechanism operable to discharge variable quantities of fluid under pressure comprising a constant delivery traverse rate pump and a variable delivery feed rate pump, said constant delivery pump supplying fluid to the variable delivery pump and all of the fluid supplied to the motor flowing through said variable delivery pump, fluid conducting means connecting said pumping mechanism and said motor, governing mechanism for controlling the volume and direction of discharge of fluid by the pumping mechanism to the motor including reversing valve means and volume control valve means determining the quantity of fluid supplied by the constant delivery pump through the variable delivery pump, and remote control means for coordinating the positions of the reversing and volume control valve means including pilot valve means shiftable to a plurality of positions for obtaining feed and traverse movement of the member in both directions.

7. In a hydraulic actuator system for driving a member at different rates and in opposite directions, in combination, a hydraulic motor associated with the member to drive the same, a positive stop for arresting the movement of the member at one end of the limit of its travel, pumping mechanism operable to discharge fluid at different volumes to the motor to drive the same at different speeds including a variable displacement pump having hydraulically actuated displacement varying means, governing mechanism for controlling the direction and volume of discharge of operating fluid by the pumping mechanism to the motor including a hydraulically shiftable reversing valve means and a hydraulically shiftable valve controlling the supply of fluid to the displacement varying means of the pump, remote control means for controlling said governing mechanism, said remote control means and said valve means comprising pilot valve means operable to precondition a circuit for shifting the reversing valve means, electrically controlled dwell valve means hydraulically associated with the pilot valve means to control the flow of fluid thereto including a definite time relay functioning to maintain said dwell valve means shifted a predetermined length of time, a first dog means operable prior to engagement of said member with said positive stop for initiating operation of the definite time relay, and a second dog means operable subsequent to said first dog means and in advance of the engagement of said member with said positive stop to shift said pilot valve means to precondition the circuit for the supply of control fluid to shift said reversing valve means upon the return of the dwell valve means to normal position.

8. In a hydraulic actuator system for driving a member at different rates and in opposite directions, in combination, a hydraulic motor associated with the member to drive the same, a positive stop for arresting the movement of the member at one end of the limit of its travel, pumping mechanism operable to discharge fluid at different volumes to the motor to drive the same at different speeds including a variable displacement pump having hydraulically actuated displacement varying means, governing mechanism for controlling the direction and volume of discharge of operating fluid by the pumping mechanism to the motor including a hydraulically shiftable reversing valve means and a hydraulically shiftable valve controlled the supply of fluid to the displacement varying means of the pump, remote control means for controlling the governing mechanism to determine the cycle of operation of the member comprising pilot valves means operable to precondition a circuit for shifting the reversing valve means, conduits connecting said pilot valve means with opposite ends of said reversing valve means, a control fluid supply conduit associated with said pilot valve means and a dwell valve means interposed in said control fluid supply conduit and having a normal position in which the conduit is open through said dwell valve means and a shifted position in which the dwell valve means closes said conduit, electrical means including a definite time relay operable when energized to shift said dwell valve means and to maintain the same in shifted position for a predetermined length of time, a first dog means moved in timed relation with the member and operable to effect energization of said electrical means prior to engagement of said member with said positive stop, and a second dog means operable subsequent to said first dog means but prior to engagement of said member with said positive stop to shift said pilot valve means and precondition the circuit for the supply of control fluid to shift said reversing valve means when control fluid is supplied to said pilot valve means upon return of said dwell valve means to normal position.

9. In a hydraulic circuit for driving a member at different rates and in opposite directions, in combination, a hydraulic motor associated with the member to drive the same, pumping mechanism for discharging fluid under pressure and at different volumes to the motor including a variable displacement pump having hydraulically actuated displacement varying means, governing mechanism for determining the volume and direction of fluid discharge by said pumping mechanism to the motor including a hydraulically shiftable valve controlling the supply of fluid to the displacement varying means of the pump and a reversing valve for selecting the direction of fluid discharge to the motor, pilot valve means for controlling the operation of said governing mechanism to determine volume and direction of fluid discharge by the pumping mechanism including a main pilot valve for determining the direction of movement selected by the reversing valve and an auxiliary pilot valve having a first shifted position for controlling said governing mechanism through said hydraulically shiftable valve to obtain a slow feed rate of movement of the member and a second shifted position in which it effects a shift of the main pilot valve to obtain a reversal in the direction of movement of the member, and means moved in timed relation with the member including a compound dog operable to move the auxiliary valve to its first shifted position and subsequently to its second shifted position.

10. In a hydraulic circuit for driving a member at different rates and in opposite directions, in combination, a hydraulic motor associated with the member to drive the same, pumping mechanism for discharging fluid under pressure and at different volumes to the motor including a variable displacement pump having hydraulically actuated displacement varying means, governing mechanism for determining the volume and direction of fluid discharge by said pumping mechanism to the motor including a hydraulically shiftable valve controlling the supply of fluid to the displacement varying means of the pump and a reversing valve, pilot valve means for controlling the operation of said governing mechanism to determine the direction and rate of movement of the member including a main pilot valve having a neutral stop position and a feed and a traverse position on each side of neutral, hydraulically operable means for shifting said main pilot valve through its stop position, a follower for shifting said main pilot valve mechanically, and an auxiliary pilot valve controlling the hydraulic shift means of the main pilot valve to move said valve through its stop position, a first means moving in timed relation with the member adapted at the end of the movement of the member in one direction to engage and shift said auxiliary pilot valve to effect a shift of the main pilot valve through stop position, and a second means moving in timed relation with the member disposed in the path of the follower for shifting the main pilot valve to a feed position.

GUNNAR A. WAHLMARK.